(12) United States Patent
Lin et al.

(10) Patent No.: US 12,461,309 B2
(45) Date of Patent: Nov. 4, 2025

(54) METHOD FOR IMPROVING OPTICAL CHARACTERISTIC UNIFORMITY OF THIN FILM DEVICE

(71) Applicant: Avago Technologies International Sales Pte. Limited, Singapore (SG)

(72) Inventors: Shiyun Lin, San Jose, CA (US); Amit Khanna, Fremont, CA (US); Ying Luo, San Diego, CA (US); Near Margalit, Westlake Village, CA (US); Nourhan Eid, San Jose, CA (US); Naser Dalvand, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 262 days.

(21) Appl. No.: 18/452,959

(22) Filed: Aug. 21, 2023

(65) Prior Publication Data

US 2025/0067933 A1  Feb. 27, 2025

(51) Int. Cl.
*G02B 6/132* (2006.01)
(52) U.S. Cl.
CPC ................... *G02B 6/132* (2013.01)
(58) Field of Classification Search
CPC ............ G02B 6/132; G02B 6/29361; G01B 2210/56; G01B 11/0625; H01L 22/12; H01L 22/20
See application file for complete search history.

(56) References Cited

U.S. PATENT DOCUMENTS 6,768,828 B2 * 7/2004 Gill .................... G02B 6/13
385/132

FOREIGN PATENT DOCUMENTS

WO    2022180832 A1    9/2022

OTHER PUBLICATIONS

European Patent Office, Partial Search Report, Application No. 24191262.5, Jan. 28, 2025, 17 pages.

* cited by examiner

*Primary Examiner* — John Bedtelyon
(74) *Attorney, Agent, or Firm* — Quarles & Brady LLP

(57) ABSTRACT

A method for improving wafer-level optical characteristic uniformity. The method includes forming a first layer of dielectric overlying the first wafer and a second layer of dielectric overlying the second wafer. The method also includes measuring a refractive index distribution of the second layer and measuring a first thickness distribution of the first layer. The method also includes determining a second thickness distribution for the first layer based on the refractive index distribution and the first thickness distribution. The method further includes removing material non-uniformly and selectively from the first layer based on the second thickness distribution, resulting in a third layer in the second thickness distribution characterized by a spectral response with a characteristic wavelength uniformity better than +/−2.5 nm across the first wafer.

20 Claims, 11 Drawing Sheets

METHOD FOR IMPROVING OPTICAL CHARACTERISTIC UNIFORMITY OF THIN FILM DEVICE

FIELD OF INVENTION

The subject technology is directed to semiconductor devices and methods of manufacturing.

BACKGROUND OF THE INVENTION

Optical Mux/Demux (Multiplexer/Demultiplexer) components were bulky and expensive and had to be implemented as separate components in the optical network. However, with the development of thin-film integrated Mux/Demux components, it is now possible to integrate these components onto a single chip or substrate, which has significantly reduced the cost and size of Wavelength-division multiplexing (WDM) optical links.

Thin-film integrated Mux/Demux components typically use waveguide technology to separate or combine the different wavelengths of light. They can be implemented using various technologies, such as silica-on-silicon, silicon-on-insulator, or polymer waveguides. The choice of technology will depend on factors such as the required wavelength range, the level of integration required, and the cost constraints. Passive Mux/Demux based on SiN dielectric thin film have been extensively studied as a potential solution. However, the yield of such devices is limited by fabrication resulting in unintended center wavelength shift, which prevents them from being widely adopted. Therefore, new techniques for improving optical characteristic uniformity for the thin film optical circuit in wafer level are proposed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
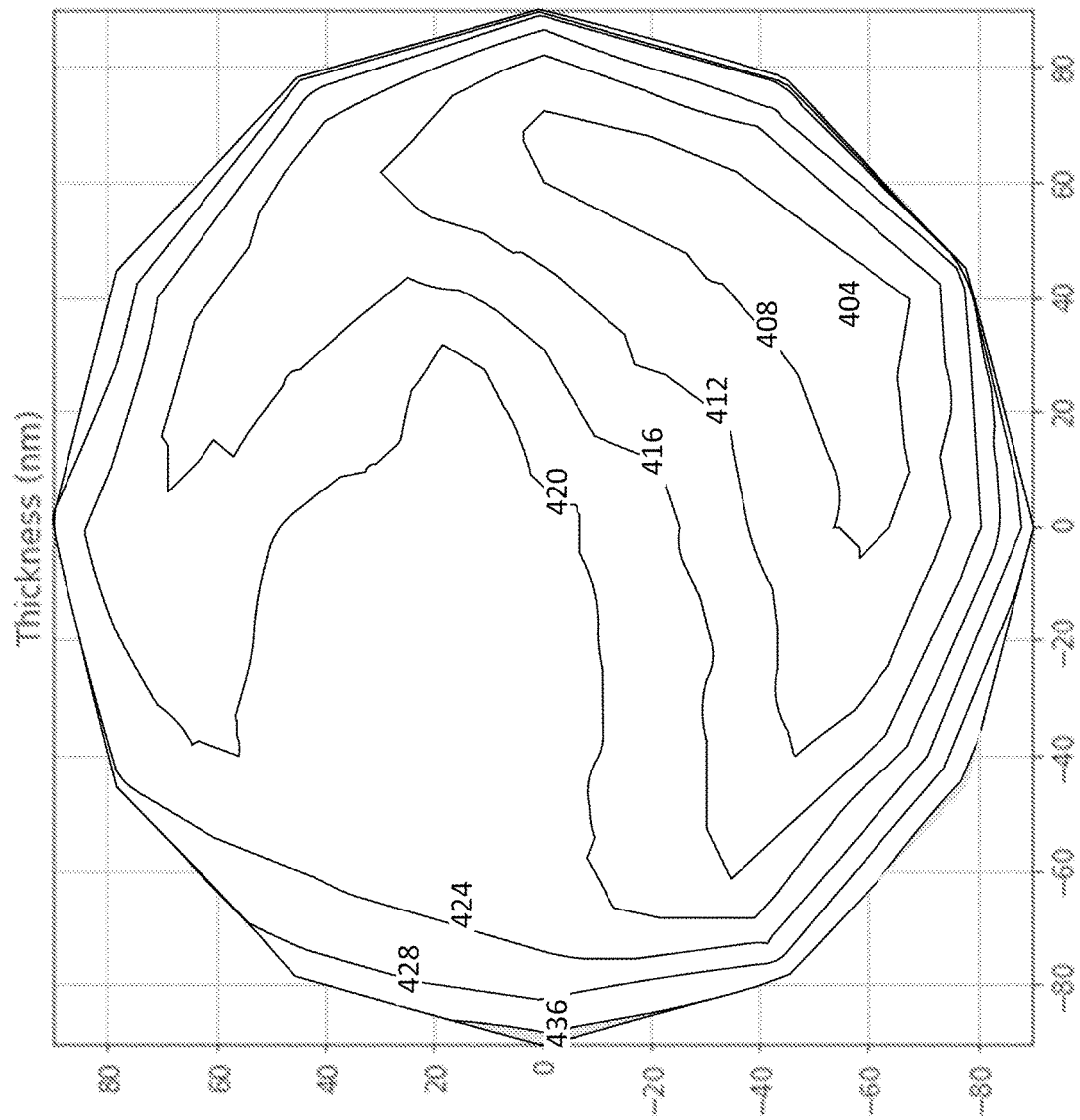
FIG. 1A is an exemplary diagram of thickness distribution of an as-deposited layer of dielectric on an 8-inch wafer.

The subject technology relates to semiconductor devices and manufacturing techniques. In a specific embodiment, a method for improving wafer-level optical characteristic uniformity is provided. The method includes measuring a thickness distribution and a refractive index distribution of a thin film of optical transparent material formed on a wafer. A target thickness distribution can be determined based on the measured thickness distribution and the refractive index distribution, aiming to compensate the refractive index variation to achieve improved wafer-level optical characteristic uniformity for all wafers in the same manufacturing process. There are other embodiments as well.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

For example, the term "circuit board", including the mentioned "main circuit board" and "sub-sized circuit board", also known as a printed circuit board (PCB), refer a flat, rigid board made of insulating material, typically fiberglass or plastic, that contains a complex network of metallic pathways, or "traces," that form the electrical circuitry for various electronic devices. Components such as resistors, capacitors, and integrated circuits are then mounted onto the board, and their leads are soldered onto the corresponding traces to create a functioning electronic circuit. "Main" or "sub-sized" is mainly referring to a lateral size of the circuit board, which is one of focal features of the present disclosure.

When an element is referred to herein as being "connected" or "coupled" to another element, it is to be understood that the elements can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present. When an element is referred to herein as being "electrically coupled" to another element, it is to be understood that the element can directly connected by an electrical conductor to another element.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

A layer of dielectric, in the context of a thin-film multiplexer/demultiplexer (mux/demux) device, is a component that facilitates the function of channeling multiple input signals into a single line (multiplexing) or separating a composite signal into multiple output lines (demultiplexing). The dielectric layer's optical properties play a role in maintaining signal integrity, preventing leakage, and reducing crosstalk between the different signal lines. In certain wideband applications, such as optical communications, these dielectric layers can be used in the construction of waveguides and optical filters, enabling the mux/demux devices to route signals based on their frequencies or wavelengths. In addition, the layer's dielectric constant could impact the device's performance, such as signal speed, loss rate, and power handling capacity.

The specific composition, structure, and deployment of the dielectric layer within the mux/demux device would vary greatly depending on the specific application, operating frequencies, and performance requirements. Hence, ongoing research and development continue to explore new materials and configurations for these dielectric layers to enhance the performance of mux/demux devices.

In an embodiment, the present disclosure provides a method for improving wafer-level optical characteristic uniformity. The method includes providing a first wafer. The method also includes providing a second wafer, the second wafer may include a silicon material, a size difference between the first wafer and the second wafer is less than 0.1%. The method also includes forming a first layer of dielectric on the first wafer and a second layer of the dielectric on the second wafer. The method also includes measuring a refractive index distribution of the second layer on the second wafer. The method also includes measuring a first thickness distribution of the first layer on the first wafer. The method also includes calculating a second thickness distribution for the first layer based on the refractive index distribution and the first thickness distribution. The method also includes removing material from the first layer based on thickness differences from the first thickness distribution to the second thickness distribution, resulting in a third layer in the second thickness distribution characterized by a spectral response with a characteristic wavelength variation less than 5 nm across the first wafer. As an example, thickness differences between the first thickness and the second thickness may involve gradual or non-gradual changes in thickness.

Implementations may include one or more of the following features. The method where the first wafer may include a silicon-on-insulator wafer. The method the deposition process is selected from one or more methods may include chemical vapor deposition (CVD), plasma-enhanced chemical vapor deposition (PECVD), low-pressure chemical vapor deposition (LPCVD), and atomic layer deposition (ALD). The first layer of dielectric and the second layer of the dielectric may include one of non-stoichiometric dielectrics selected from SiNx, SiONx, SiOx, and amorphous Si, the first layer and the second layer being formed by performing a deposition process.

The method may include reducing a thickness variation of the second layer before measuring the refractive index distribution. Measuring the refractive index distribution may include using an in-line ellipsometry. Measuring the first thickness distribution may include using ellipsometry, reflectometry, or spectrometry. Removing material may include using a focused beam of positive ions to scan across the first layer on the first wafer with a vertical resolution lower than 1 nm and a lateral resolution lower than 1 um.

Ellipsometry is a powerful optical technique used for the characterization of the complex refractive index or the dielectric function of thin layers. It measures the changes in the polarization state of light upon reflection or transmission and can be used to determine layer thickness, optical constants, and other material properties. It's a non-destructive and highly sensitive method, and it has been widely used in many fields such as semiconductor technology, materials science, and photovoltaics. In-line ellipsometry offers the advantage of real-time monitoring during the manufacturing process, providing immediate feedback that can be crucial for quality control and process optimization. As it's a non-contact and non-destructive method, it does not interfere with the production process or damage the sample, making it a preferred choice for many industrial applications. Reflectometry involves measuring the intensity of light reflected from a surface to determine properties of that surface. It can be used to analyze surface roughness, layer thickness, refractive index, and other optical properties of materials. Reflectometry can be performed using various types of light, including visible, infrared, and ultraviolet, and it can be utilized in a wide range of applications. Spectrometry refers to a broad range of techniques used to measure and analyze the spectrum of light or other types of electromagnetic radiation emitted or absorbed by a sample. Spectrometric analysis can reveal a wealth of information about the sample, including its chemical composition, molecular structure, and physical properties. There are many different types of spectrometry, including mass spectrometry, atomic absorption spectrometry, and Raman spectrometry, each with its own set of applications and capabilities. Spectrometry is used in a diverse array of fields, such as chemistry, physics, astronomy, environmental science, and medicine.

Additionally, the method may include dicing the first wafer to a first die, the first die may include an optical circuit. The optical circuit may include a thin-film filter. Calculating the second thickness distribution may include calculating a first regional thickness distribution on a first region of the first wafer corresponding to a first target wavelength and a second regional thickness distribution on a second region of the first wafer corresponding to a second target wavelength. The method may include: removing material from the first layer on the first region based on the first regional thickness distribution and material from the first layer on the second region based on the second regional thickness distribution, resulting a fourth layer on the first region and a fifth layer on the second region, the fourth layer being characterized by a first spectral response with a characteristic wavelength within +/−2.5 nm around the first target wavelength and the fifth layer being characterized by a second spectral response with a characteristic wavelength within +/−2.5 nm around the second target wavelength. The method may include: singulating the first wafer to a first plurality of dies from the first region and a second plurality of dies from the second region, each of the first plurality of dies may include an optical circuit based on the first modified layer having the characteristic wavelength within +/−2.5 nm around the first target wavelength and each of the second plurality of dies may include an optical circuit based on the second modified layer having the characteristic wavelength within +/−2.5 nm around the second target wavelength.

According to another embodiment, the present disclosure provides a wafer-level optical circuit. The circuit also includes a first layer of a dielectric material on a portion of a first wafer, the first layer being characterized by a spectral response uniformity across the first wafer having a characteristic wavelength within +/−2.5 nm of a target wavelength. The circuit also includes where the first layer is made by depositing the dielectric material on the first wafer in a first process; measuring a first thickness distribution across the first wafer; determining a second thickness distribution across the first wafer based on a refractive index distribution and the first thickness distribution, the second thickness distribution corresponding to the target wavelength; removing selectively the dielectric material based on the second thickness distribution to form the first layer; and patterning the first layer to define a plurality of dies, each die may include an optical circuit based on the first layer.

Implementations may include one or more of the following features. The circuit where the first layer may include one of non-stoichiometric dielectrics selected from SiNx, SiONx, SiOx, and amorphous Si and the first wafer may include a SOI wafer. The refractive index distribution is determined by depositing the dielectric material on a second wafer in a second process arranged with a same setting as the first process, the second wafer being a blanket silicon wafer; reducing thickness variation of the second layer on the second wafer; and measuring the reflection index distribution of the second layer. The optical circuit may include an optical multiplexer or demultiplexer for coarse wavelength-division multiplexing (CWDM) optical link or for dense wavelength-division multiplexing (DWDM) optical link.

According to yet another embodiment, the present disclosure provides a method for processing semiconductor devices. The method also includes providing a plurality of wafers. The method also includes forming a first layer of dielectric on each of the plurality of wafers in a first process. The method also includes measuring a thickness distribution of the first layer across a first wafer selected from the plurality of wafers. The method also includes patterning the first layer to a first plurality of optical circuit dies on the first wafer in a second process. The method also includes measuring a spectral response of the first layer characterized by a wavelength for each of the first plurality of optical circuit dies to obtain a wavelength distribution across the first wafer. The method also includes determining correlations between wavelength differences and thickness differences across the first wafer based on the wavelength distribution and the thickness distribution. The method also includes determining a target thickness distribution for the first layer based on the correlations and a target wavelength. The method also includes modifying the first layer on each of the plurality of wafers to obtain a second layer having the target thickness distribution. The method also includes patterning the second layer to a second plurality of optical circuit dies on each of the plurality of wafers in the second process. The method also includes singulating each of the plurality of wafers to obtain the second plurality of optical circuit dies, each optical circuit being based on the second layer characterized by a spectral response with a center wavelength being within +/−2.5 nm of the target wavelength.

The method where each of the plurality of wafers may include a silicon-on-insulator (SOI) wafer. The first layer of dielectric may include one of non-stoichiometric dielectrics may include SiNx, SiONx, SiOx, amorphous Si. The process for forming thin-film integrated optical circuits like Mux/Demux components starts with preparing an appropriate substrate, such as a wafer of silicon, silica, glass, and lately, silicon-on-insulator (SOI) wafer for CMOS compatible process. Then a thin layer of optical core material is deposited onto the substrate using techniques such as sputtering, chemical vapor deposition (CVD), spin coating etc. The optical core material is typically a high-index non-stoichiometric dielectrics material, such as silicon nitride (SiNx), silicon oxynitride (SiONx), or doped silica, which transmits light within the thin-film waveguide structure or selectively reflects out as demultiplexer does.

Figure 1B:
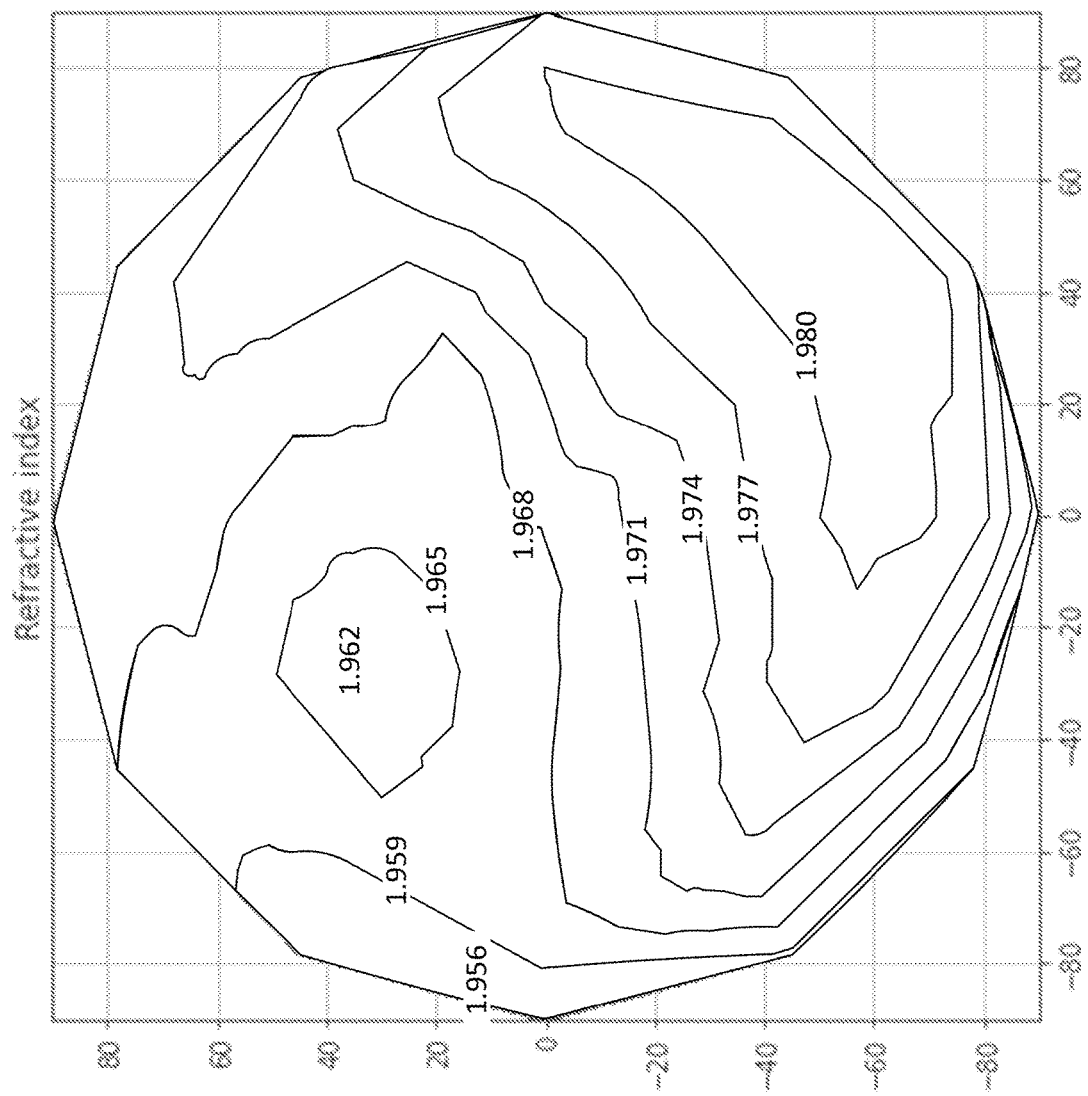
FIG. 1B is an exemplary diagram of refraction index distribution of a layer of dielectric on an 8-inch wafer.

For wavelength-division multiplexing (WDM) optical circuit, for example, SiNx-based thin-film passive Mux/Demux have been extensively considered for many applications. Due to the film deposition tool configuration, the thickness and refractive index of SiNx film have a wafer process distribution that can both induce a large wavelength variation which causes center wavelength error and limits the yield of such devices. For example, FIG. 1A shows an exemplary diagram of the thickness distribution of a SiNx film on an 8-inch wafer. The thickness distribution refers to thickness variation of the layer of dielectric (i.e., SiNx film) from point-to-point across the wafer surface, as seen, can be as large as 32 nm. This property is one of many factors that directly impacts the performance, yield, and reliability of the devices fabricated on the wafer. Improving the uniformity of the dielectric layer thickness across the wafer is an ongoing challenge in semiconductor manufacturing. FIG. 1B shows an exemplary diagram of refractive index distribution of a SiNx layer on an 8-inch wafer with a range between 1.980-1.956. The refractive index distribution refers to refractive index variation of the layer of dielectric from point-to-point across the wafer surface. This is a critical parameter in many optical and electronic applications, as the refractive index influences the behavior of light passing through the dielectric layer. This variation can lead to performance inconsistencies in the devices or systems utilizing the dielectric layer. Since the SiNx layer is usually non-stoichiometric with varying composition, defects and stress therein due to variations in energy, temperature, and chemical reactions during the CVD deposition process, the non-uniformity in wafer-level refractive index distribution still exists even when the layer can get a highly uniform thickness in any existing thin-film uniformization process.

When light of a certain wavelength ($\lambda$) passes through the layer, if the thickness (d) of the layer is an integer multiple of half the wavelength of light (considering the wavelength inside the material, $\lambda/n$), constructive interference occurs, and the light is transmitted at its maximum intensity. This can be expressed as $d=m*\lambda/(2n)$, where n is refractive index of the layer of dielectric and m is an integer representing the order of the interference. The layer will transmit light most efficiently at a wavelength $\lambda$ where d is an integer multiple of $\lambda/(2n)$. This wavelength is the channel center wavelength. Therefore, if the thin-film formation process for the layer of dielectric results in nonuniformity of the thickness d of the layer of dielectric or its refractive index n across the wafer, such nonuniformity will impact the spectral response of the layer of dielectric, e.g., the channel center wavelength for the layer of dielectric to be used as an optical filter.

Figure 2:
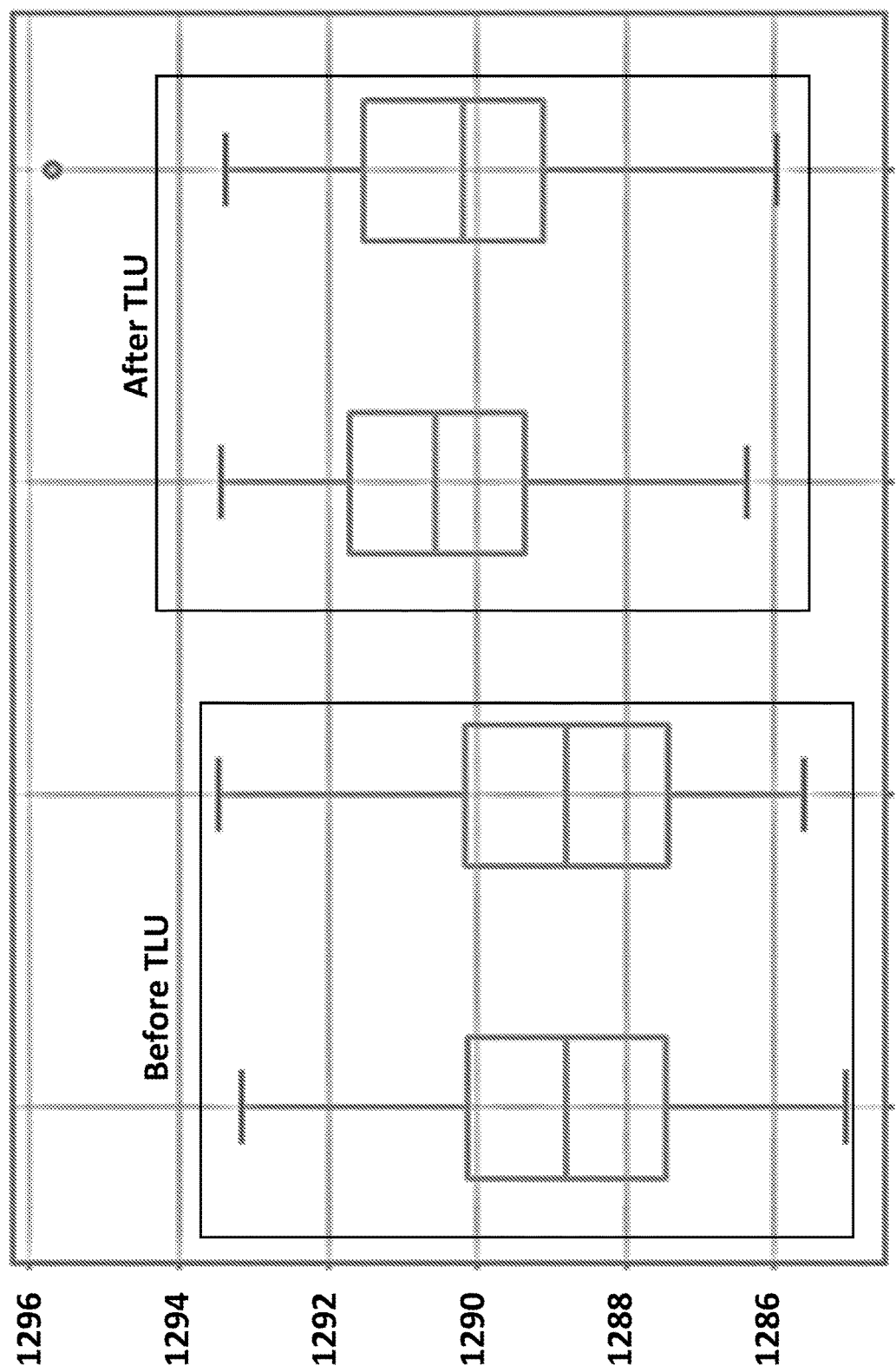
FIG. 2 is an exemplary diagram of comparison of center wavelength variations of demultiplexers based on a layer of dielectric that is pre- and post-uniformization processed on each of two wafers in a same lot.

FIG. 2 is an exemplary diagram showing a comparison of center wavelength variations of demultiplexers based on the SiNx layer that is pre- and post-uniformization process on each of two wafers in a same lot. Before the thickness uniformization process, the layer thickness may not be uniform any way, the center wavelength may vary from wafer to wafer with errors as large as 8-10 nm. However, after the thickness uniformization process, though the layer thickness is uniform now, the center wavelength variation is still near 10 nm due to the larger contribution from material characteristic, such as, refractive index variation of the layer, which is not acceptable to integrated WDM applications.

To achieve spectral response wavelength uniformity of a thin layer, it ultimately depends on how to manage the phase of light along its way passing through the layer. The phase may be affected by many factors like the waveguide width, side-wall angle, the layer thickness, the refractive index, process or temperature induced stress. In some embodiments, the present disclosure provides a technique of improving optical characteristic uniformity of a thin layer by engineering the layer thickness to reduce or compensate all forms of phase errors due to refractive index, width, sidewall angle, and process-related factors. Specifically, the layer thickness distribution of a layer of dielectric on a wafer is modified locally to obtain a nonuniform target thickness distribution to compensate the known nonuniform refractive index distribution across the wafer to achieve wafer-level uniform wavelength targeting. In general, the thin layer of dielectric on a wafer can be used for forming many kinds of integrated planar optical circuits on the wafer including WDM Mux/DeMux, splitters, combiners, filters, modulators, and detectors. This disclosure just uses WDM Mux/DeMux as an example for demonstration of the application of the proposed technique to improve wafer-level uniformity of its characteristic center wavelength. SiNx layer is also just an example in this disclosure as this technique should be applicable generally for all non-stoichiometric dielectric layers used for forming integrated optical circuits on the wafer, for example, SiONx, SiOx, or amorphous Si, etc. In general, the layer or thin film for achieving multiple various channel wavelengths of the Mux/DeMux may be a single layer or multiple layers with different optical characteristics. Considering the thickness scale of trimming the layer may be mostly around a range of 10 nm or less and the film material is non-stoichiometric in nature, an ion-beam trimming tool compatible with CMOS technology can be adopted in-line to trim the layer or primarily a single layer without a significant increase of fab cycle time.

In an embodiment, the phase errors induced by the local refractive index variation of a layer of non-stoichiometric dielectric material on a wafer can be compensated by trimming the layer thickness from selected local regions to achieve uniform optical characteristics across the wafer. The wafer level refractive index distribution of the layer of dielectric can be measured using industry-standard ellipsometer. The wafer level thickness distribution of the layer can also be measured using in-line ellipsometry, or reflectometry, or spectrometry. Since the nonuniformity of refractive index is mainly due to composition of the layer of dielectric imposed by deposition process of the dielectric materials and is not sensitive to the thickness, the refractive index distribution measured before trimming the layer thickness would be substantially the same as the distribution after trimming. In the specific implementation, both the real part n and imaginary part k of the refractive index (n, k) are measured accurately for both the layer or thin film deposited on the product wafers and a reference wafer (usually a simple silicon wafer is used). The correlation between the two refractive index distributions is compared and ensured. Then, a target thickness distribution for trimming the layer of dielectric can be calculated based on measured refractive index distribution on the reference wafer and the thickness distribution on the product wafer before trimming. Accordingly, the required thickness differences on local regions across the product wafer can then be determined.

Figure 3A:
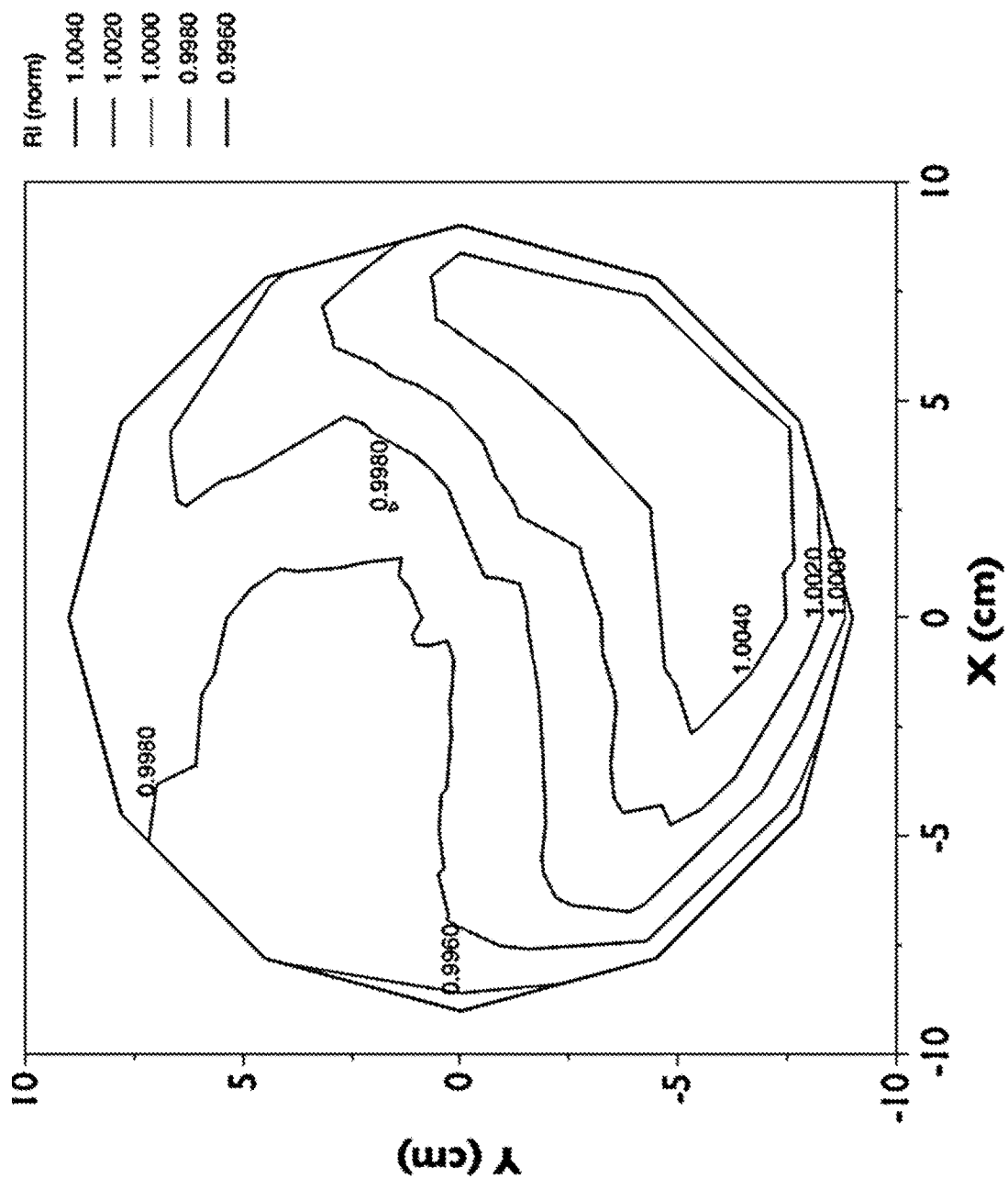
FIG. 3A is an exemplary diagram of wafer-level refractive index distribution of a layer of dielectric trimmed to achieve optical characteristic uniformity according to embodiments of the subject technology.
Figure 3B:
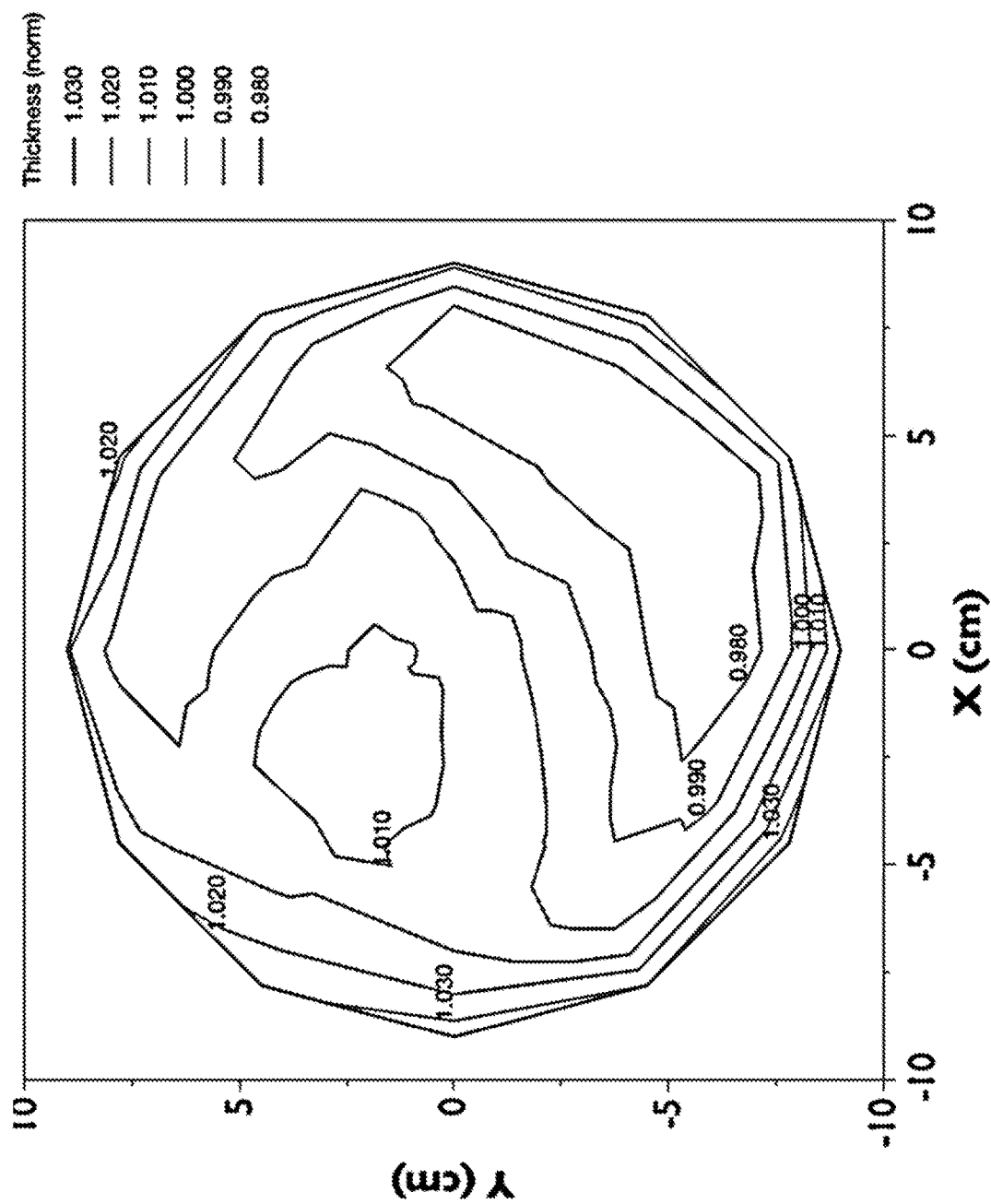
FIG. 3B is an exemplary diagram wafer-level thickness distribution of the layer of dielectric trimmed to achieve optical characteristic uniformity according to embodiments of the subject technology.

FIGS. 3A and 3B show both wafer-level refractive index distribution and the thickness distribution of the trimmed or modified layer of dielectric according to required thickness differences across the wafer. Both distributions are normalized to respective means for the 8-inch (or 12-inch) diameter wafer. Only the real part n of the refractive index (n, k) is included in the distribution map. The comparison of FIG. 3A and FIG. 3B clearly shows a mutual compensation nature between the two distributions, e.g., the higher values of refractive index near the lower right regions of the wafer are compensated by relative smaller thickness values in the same regions. This leads to improved uniformization of the phase, which leads to improved optical characteristic uniformity in wafer level.

Figure 4A:
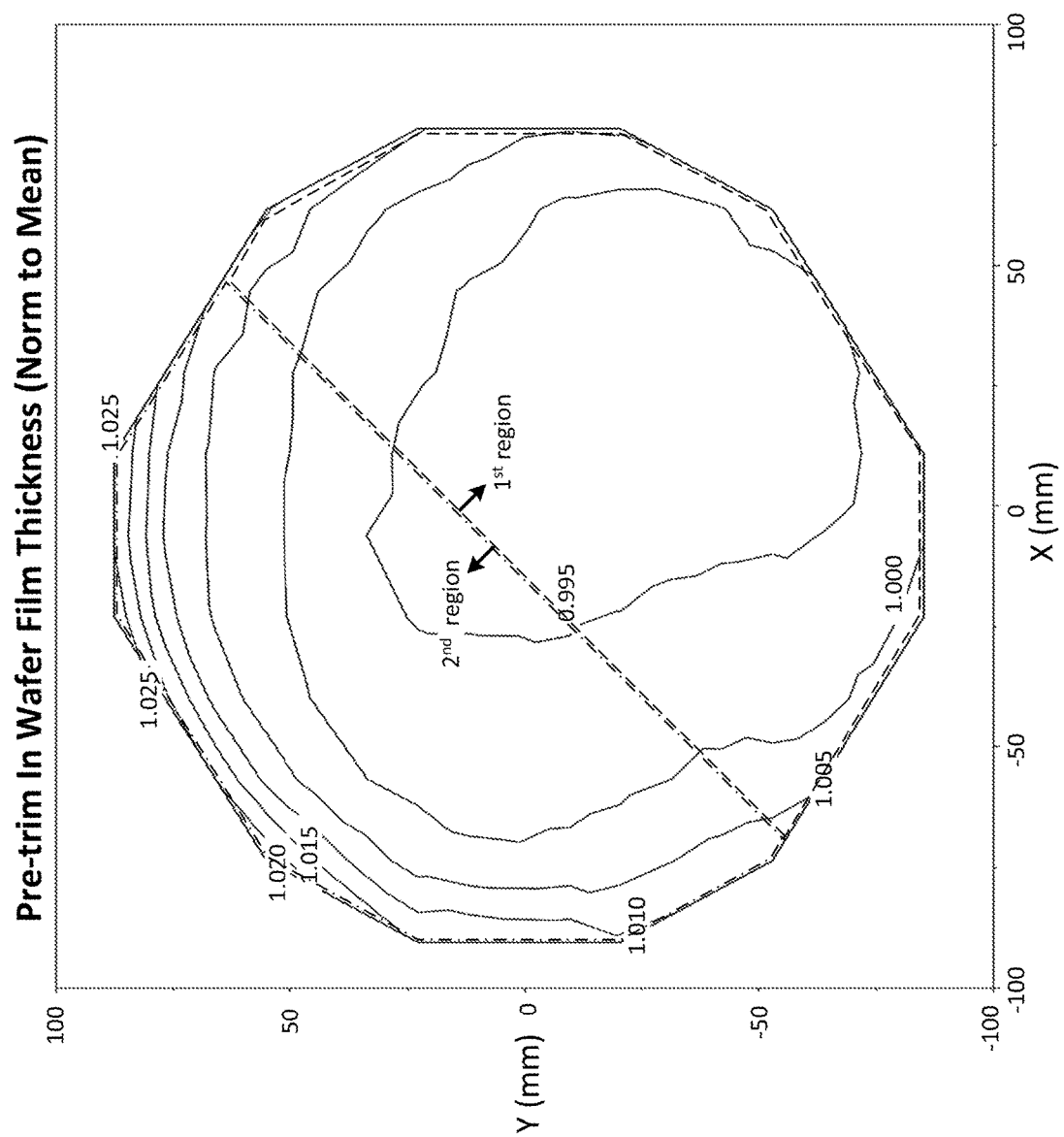
FIG. 4A is an exemplary diagram of a first thickness distribution of a layer of dielectric as-deposited on a product wafer according to embodiments of the subject technology.
Figure 4B:
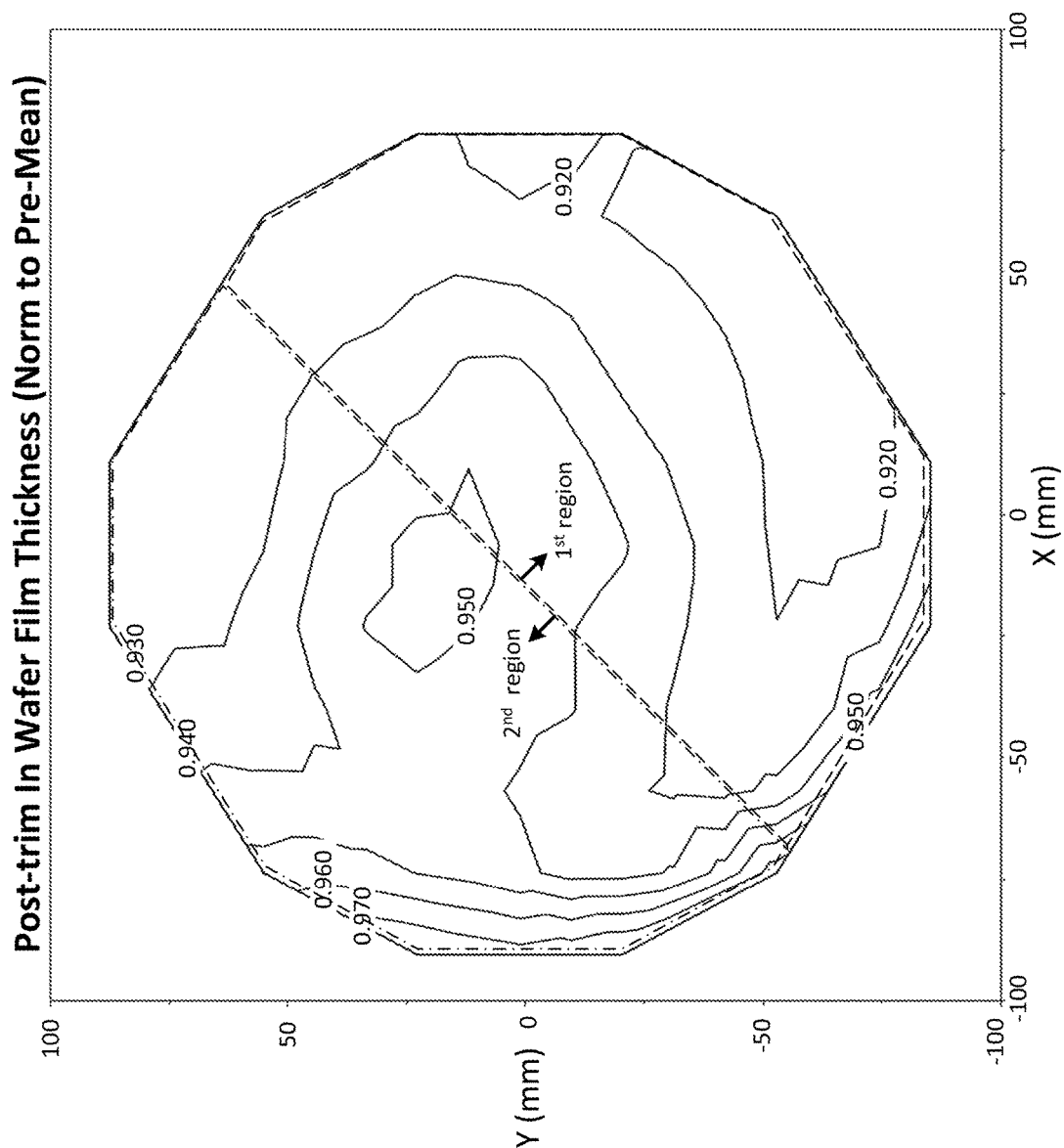
FIG. 4B is an exemplary diagram of a second thickness distribution of the layer of dielectric modified for optical characteristic uniformity according to embodiments of the subject technology.

FIG. 4A shows an exemplary diagram of a first thickness distribution of a layer of dielectric as-formed on a product wafer according to embodiments of the subject technology. The thickness shown in the figure is normalized to a mean value across the product wafer. In an example, the layer of dielectric is SiNx film, aiming for forming a thin-film optical filter for WDM demultiplexers. The product wafer is an SOI wafer. A thin-film optical filter is a device that selects or blocks specific wavelengths (or ranges of wavelengths) of light while letting others pass through. It does this by utilizing the interference of light waves reflecting off the interfaces of thin layers, or films, of materials with different refractive indices. In an embodiment, based on the first thickness distribution and the refractive index distribution of the layer of dielectric, a second thickness distribution that can compensate the refractive index in all local regions can be calculated. Optionally, a compensation mask can be made based on the difference between the second thickness and first thickness and applied overlying the layer to perform non-uniform thickness trimming to get an enhanced optical characteristic uniformity. In some embodiments, an ion-beam trimming (IBT) tool can be implemented, without need of the mask map, to use a focused beam of positive ions with controlled beam energy to scan across the wafer. Higher beam energy plus longer beam exposure time would lead to larger amount of dielectric material being removed to achieve thickness adjustment. For comparison, FIG. 4B shows an exemplary diagram of a second thickness distribution of the layer modified for optical characteristic uniformity according to embodiments of the subject technology. The second thickness distribution is also normalized to the mean value of the first thickness before modification. The layer modification process above is essentially a trimming process, leading to the second thickness a generally smaller. As seen in FIG. 4B, about 8% or less layer thickness is trimmed. In terms of using ion-beam trimming tool, the layer thickness can be controlled very accurately with vertical thickness resolution smaller than 1 nm and lateral resolution smaller than 1 um across the 8-inch wafer. Referring to FIGS. 3A and 3B, the post-trim thickness distribution as shown in FIG. 4B can properly compensate a corresponding refractive index distribution of a layer of dielectric formed in a same deposition process on a product wafer of the same type, to achieve wafer level optical characteristic uniformity for the trimmed layer.

Figure 5:
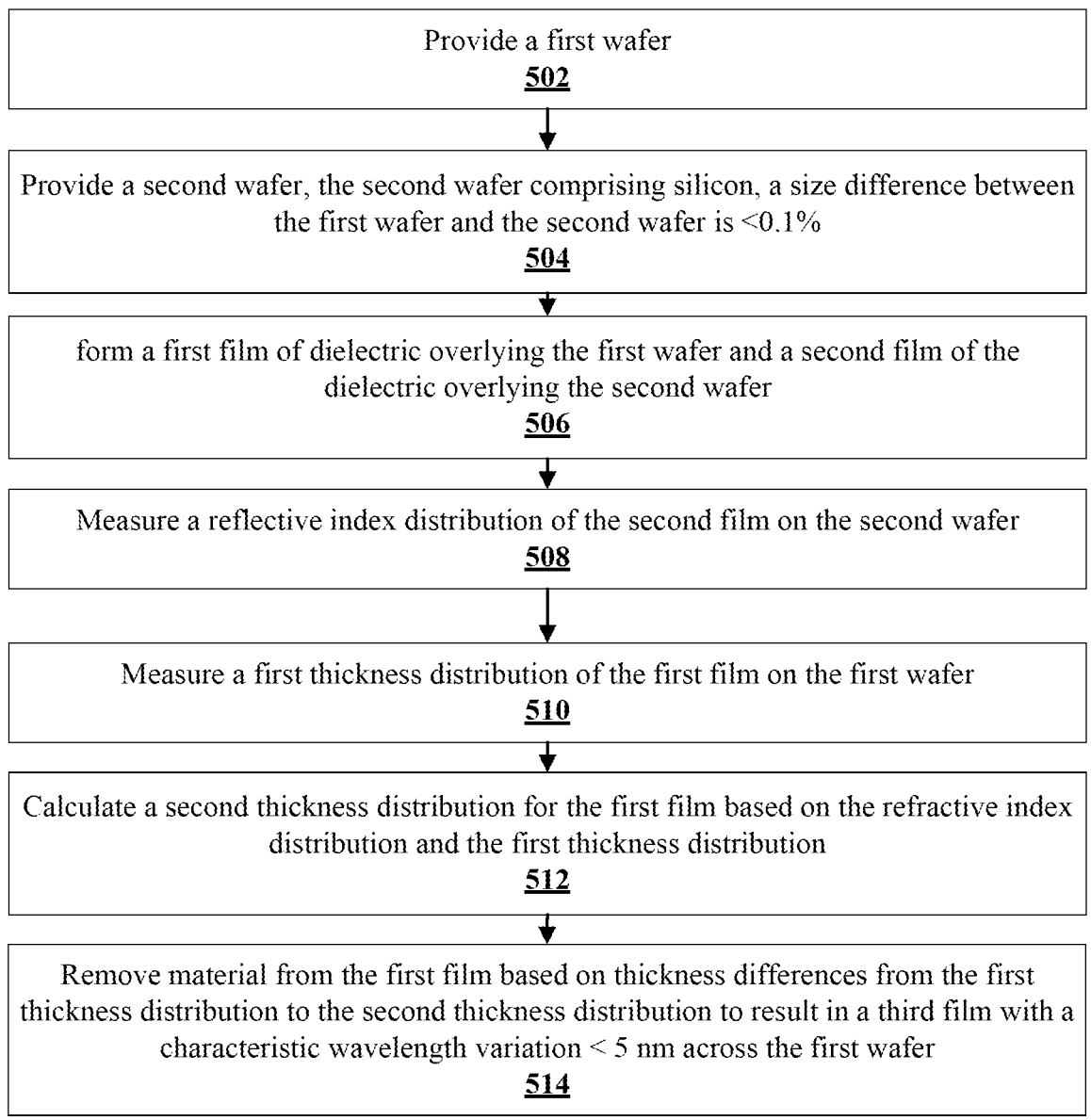
FIG. 5 is a flow chart diagram of a method for improving wafer-level optical characteristic uniformity according to some embodiments of the subject technology.

FIG. 5 is a flow chart diagram of a method for improving wafer-level optical characteristic uniformity according to embodiments of the subject technology. This diagram is merely an example, which should not unduly limit the scope of the claims. One of ordinary skill in the art would recognize many variations, alternatives, and modifications. FIG. 5 just summarizes a method or a process for improving wafer level thin film optical characteristic uniformity by engineering the layer thickness nonuniformly for compensating the corresponding refractive index non-uniformity.

The method 500 includes step 502 of providing a first wafer which is a product wafer that is used for making integrated optical circuits based on a layer or thin film of dielectric formed in a predetermined process. In an exemplary implementation, the product wafer is a silicon-on-insulator (SOI) wafer. A SOI wafer is an advanced form of silicon wafer that has a unique structure consists of three layers: a thin surface layer of silicon, a middle layer of insulating material, often silicon dioxide, and a thicker silicon substrate at the bottom, which is commonly used for producing thin film integrated optical circuits under CMOS technology platform. Of course, other types of wafers can be used. The claimed technique is not limited to the type of product wafer.

The method 500 includes step 504 of providing a second wafer. The second wafer is used as a reference wafer or testing wafer having the same diameter as the first wafer. In general, the typical size variation in wafer diameter can be limited to 0.1% or less. In some embodiments, the second wafer is a simpler wafer than the first wafer, e.g., it is a blanket silicon wafer. A silicon wafer, at its simplest, is a thin slice of crystalline silicon with a well-polished surface and being used as fundamental substrate for semiconductor devices like integrated circuits (ICs). Using silicon wafer, instead of SOI product wafer, can reduce some errors or noises due to multilayer scattering when taking measurements of refractive index distribution of the layer of dielectric on the wafer and reduces cost.

At step 506, method 500 includes forming a first layer of dielectric overlying the first wafer and a second layer of dielectric overlying the second wafer. In an embodiment, the first wafer and the second wafer are disposed in the same manufacture processing environment, e.g., a same lot in the deposition chamber. The first layer and the second layer comprise the same type of dielectric material, e.g., non-stoichiometric dielectric, selected for forming integrated optical circuits, including SiNx, SiONx, SiOx, and amorphous Si, or others. In a specific embodiment for depositing non-stoichiometric dielectric material, one of following deposition methods are used, including Chemical Vapor Deposition (CVD), Plasma-Enhanced Chemical Vapor Deposition (PECVD), Low-Pressure Chemical Vapor Deposition (LPCVD), and Atomic Layer Deposition (ALD), etc. In an example for making WDM Mux/DeMux optical circuits, SiNx layer is formed.

At step 508, method 500 includes measuring a refractive index distribution of the second layer on the second wafer. Ellipsometry is used to do the measurement which can be performed in-line after the layer is formed through the deposition process. In-line ellipsometry is a powerful, non-destructive optical characterization technique that provides real-time, in-situ measurements of thin film properties such as thickness, refractive index, by detecting polarization change of a reflected light beam from the layer. Optionally, to eliminate thickness factor to affect the result, a thin layer uniformization process is firstly performed on the layer overlying the second wafer to make the layer thickness to be substantially uniform across the second wafer. Optionally, the focused ion beam with controlled beam energy is used in the thin layer uniformization process, which has fine vertical resolution of <1 nm to ensure the uniformity of the layer. The use of blanket silicon wafer for the second wafer also eliminates complex multireflection from other layers on a typical SOI wafer. As a result, a refractive index distribution of the first layer is measured. The data of the refractive index distribution is saved.

At step 510, method 500 also includes measuring a first thickness distribution of the first layer of dielectric on the first wafer. The layer thickness can be measured by ellipsometry, reflectometry, and spectrometry, all of which are nondestructive to the layer and are in-situ implemented. The first thickness distribution typically is nonuniform. FIG. 4A shows an example of the first thickness distribution of such a layer of dielectric overlying an 8-inch SOI wafer. As a result of this step, a first thickness distribution is measured, and the data are also saved.

The method 500 further includes step 512 for calculating a second thickness distribution for the first layer based on the refractive index distribution and the first thickness distribution. Since the first layer and the second layer are results of a same lot on same sized wafers, the data of refractive index distribution of the second layer can be the same for the first layer with negligible errors. Combining the data of refractive index distribution and the first thickness distribution, a second thickness distribution can be calculated such that the second thickness distribution of a modified layer can effectively compensate nonuniform refractive index distribution to achieve an optical characteristic uniformity across the wafer. In a specific embodiment, the optical characteristic is a spectral response wavelength, e.g., a center wavelength of an output of a WDM demultiplexer based on the modified layer. In some embodiments, a required thickness differences across the first wafer from the first thickness distribution to the second thickness distribution is obtained and can be used to design a refractive-index (RI) compensation lookup table to guide the modification of the first layer. For example, the required thickness differences across the first wafer are used as input data for programming a trimming tool to trim the first layer accordingly.

At step 514, method 500 includes removing material selectively from the first layer based on the thickness differences from the first thickness distribution to the second thickness distribution to result in a modified layer with optical characteristic uniformity. This is the step for engineering the layer thickness to improve optical characteristic uniformity. Optionally, following step 512, the RI-compensating lookup table is applied to perform a non-uniform thickness trimming to the first layer to get the modified layer with a relatively improved wafer level optical characteristic uniformity. In the embodiment, an ion-beam trimming tool is employed to trim the first layer. Ion beam trimming (IBT) is based on ion beam etching using a small beam of positively charged ions to etch material from a wafer by ion bombardment. Other variants of the IBT, including reactive IBT or chemically assisted IBT can be used to enhance the throughput or material selectively. During the trimming process a focused ion beam scans across the wafer. By controlling the beam energy and adjusting the local beam dwell time, it can precisely modify the material thickness and device properties like the Mux and Demux wavelength. With beam energy control and scan speed (i.e., exposure time) control, the vertical or thickness variation can be controlled with a sub-nanometer resolution. The modified layer can be formed by using IBT to selectively remove dielectric material from the first layer to reach the second thickness distribution, which is designed to target a characteristic response wavelength, e.g., a center wavelength of a demultiplexer based on the modified layer. Since the optical characteristic uniformity is achieved in wafer level, the modified layer on the first wafer also becomes a natural wafer-level optical circuit that is characterized by a characteristic wavelength uniformity.

In a specific embodiment, the first wafer where the modified layer overlays can be processed further in some additional downstream steps (not shown in FIG. 5) of the method 500 including patterning the modified layer to define a plurality of optical circuit dies on the first wafer and singulating the first wafer to obtain individual optical circuits. In an example, each optical circuit comprises a demultiplexer or multiplexer with one or multiple wavelength channels (each having a center wavelength separated from another by 20 nm) for coarse wavelength-division multiplexing (CWDM) optical links. Or each optical circuit may include a demultiplexer or multiplexer with one or multiple wavelength channels (with more narrow wavelength bands) for dense wavelength-division multiplexing (DWDM) optical links. In some embodiments, the uniformity of optical characteristic of these demultiplexers or multiplexers based on the modified layer across the wafer can be demonstrated by how good their center wavelengths are targeting the designated CWDM (or DWDM) channel wavelengths. For example, by applying method 500 to trim the SiNx film to a target thickness distribution across the wafer leads to a plurality of demultiplexers based on the trimmed SiNx film characterized by corresponding center wavelength variation less than 5 nm (or in some instance +/−2.5 nm) around the designated CWDM channel wavelength.

In some embodiments, the method 500 disclosed above may have other variations. For example, one or more steps may be added, removed, repeated, rearranged, modified, replaced, and overlapped, and they should not limit the scope of the claims. In an embodiment, step 512 for calculating the second thickness distribution may include calculating a first regional thickness distribution on a first region (denoted as $1^{st}$ region surrounded by a dashed line shown in FIG. 4A) of the first wafer corresponding to a first target wavelength and a second regional thickness distribution on a second region (denoted as $2^{nd}$ region surrounded by a dash-dot line in FIG. 4A) of the first wafer, also shown in FIG. 4A, corresponding to a second target wavelength. Then, the method may include the following step for removing material selectively from the first layer on the first region based on the first regional thickness distribution and from the first layer on the second region based on the second regional thickness distribution. This step results in a first modified layer with the first regional thickness distribution on the first region (denoted as $1^{st}$ region surrounded by a dashed line FIG. 4B) and a second modified layer with the second regional thickness distribution on the second region (denoted as $2^{nd}$ region surrounded by a dash-dot line shown in FIG. 4B). The first modified layer is characterized by a first spectral response with a characteristic wavelength within a 5-nm range around the first target wavelength and the second modified layer is characterized by a second spectral response with a characteristic wavelength within a 5-nm range around the second target wavelength. Furthermore, the method may include following step for singulating the first wafer to a first plurality of dies from the first region and a second plurality of dies from the second region. Each of the first plurality of dies comprises an optical circuit based on the first modified layer having the characteristic wavelength within a 5-nm range around the first target wavelength and each of the second plurality of dies comprises an optical circuit based on the second modified layer having the characteristic wavelength within a 5-nm range around the second target wavelength.

In an alternative embodiment, the present disclosure provides a technique of nonuniform thickness trimming of the layer or thin film of dielectric based on characteristic wavelength for improving wafer level optical characteristic uniformity. In this approach, the target thickness distribution of the layer of dielectric is determined by compensating the process-induced wavelength variation instead of compensating the refractive index variation. Due to tool limitations, obtaining accurate refractive index and thickness across the wafer may not always be feasible. Measuring the optical center wavelength of the Mux/Demux circuit (based on the layer) can provide another feedback for the phase trimming to improve optical characteristic uniformity, because the wavelength distribution is mostly consistent for wafer lots processed in the same time window. Specifically, this approach is firstly to measure the wavelength distribution of final Mux/Demux circuits based on a first layer on a send ahead wafer selected from a wafer lot. Then, a correlation between the measured wavelength distribution and corresponding thickness distribution can be determined to generate a target thickness distribution for the to-be-trimmed layer in all following product wafers of the same wafer lot. The layers on the following product wafers are then nonuniformly trimmed based on the target thickness distribution to compensate for the wavelength variations, e.g., to allow better than +/−2.5 nm center wavelength targeting of the final Mux/Demux circuits. This leads to an alternative approach to be shown in the next section for achieving wafer level optical characteristic uniformity by nonuniform thickness trimming.

Figure 6:
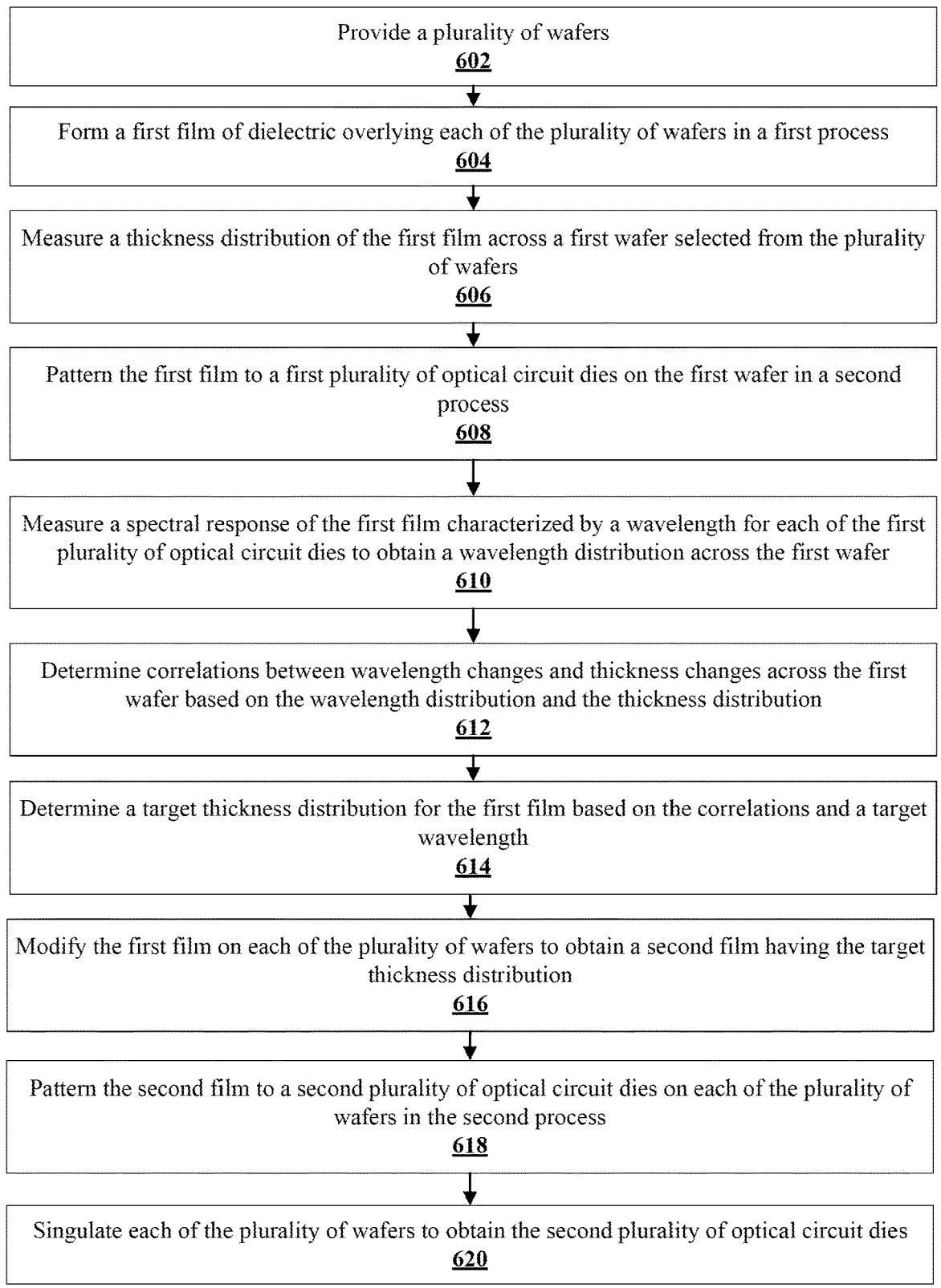
FIG. 6 is a flow chart diagram of a method for improving wafer-level optical characteristic uniformity according to some embodiments of the subject technology.

FIG. 6 is a flow chart diagram of a method for improving wafer-level optical characteristic uniformity according to some other embodiments of the subject technology. This diagram is merely an example, which should not unduly limit the scope of the claims. One of ordinary skill in the art would recognize many variations, alternatives, and modifications. FIG. 6 just summarizes key processes of using Mux/Demux wavelength as thickness compensation feedback for improving wafer level thin film optical characteristic uniformity. As the mux/Demux wavelength can be affected by change of stress and bowing in wafers related to process flow and thermal budget. The wavelength variations due to these factors are usually consistent if the film deposition process and downstream integration process are well maintained, at least for the wafer lots in certain time windows. Wavelength feedback certainly can be applied to pre-compensate for the optical characteristics changes due to wafer bowing and stress. Further, stress, temperature, and moisture factors during the downstream integration process can also change the optical properties and cause wavelength shift. Again, the method proposed here can be applied to pre-compensate for the optical characteristics changes due to downstream integration process.

Specifically, method 600 includes step 602 for providing a plurality of wafers. These wafers can be directly product wafers, e.g., SOI wafers, of the same wafer lot to be used in the actual manufacturing processes of thin film integrated optical circuits.

Method 600 also includes step 604 for forming a first layer of dielectric overlying each of the plurality of wafers in a first process. Here the first layer can be, as an example, a SiNx film for making thin-film WDM Mux/Demux circuits. More generally, the first layer is a layer of non-stoichiometric dielectric material. The first process, as an example, is a deposition process using one of following methods including Chemical Vapor Deposition (CVD), Plasma-Enhanced Chemical Vapor Deposition (PECVD), Low-Pressure Chemical Vapor Deposition (LPCVD), and Atomic Layer Deposition (ALD). Here, all wafers may experience various effects from factors like layer composition, wafer bowing, stress, temperature, or moisture in the first process. These effects may be controlled to a same level for the plurality of wafers if the same set of process parameters for the first process is fixed.

Method 600 also includes step 606 for measuring a thickness distribution of the first layer across a first wafer selected from the plurality of wafers. The first wafer is selected as a reference wafer for both thickness and optical characterization in wafer level (which can be done in-situ). As an example, a normalized 2-dimensional thickness wafer map based on the measured thickness distribution is shown in FIG. 4A. The optical characterization, e.g., a characteristic wavelength measurement, will be done after going through a series of downstream processes.

At step 608, method 600 also includes patterning the first layer to a first plurality of optical circuit dies on the first wafer in a second process. Each optical circuit die can be, for example, a demultiplexer (Demux). The second process here is referred to a series of downstream integration processes including photo lithography, etching, cleaning, etc. to define all the first plurality of optical circuit dies on the first wafer. The patterning without trimming the layer serves as a common pre-condition for wavelength feedback for all optical circuit dies. The second process will be fixed to a same setting for the first wafer (a test wafer that is patterned but the first layer is not trimmed) and remaining product wafers (the first layer on the product wafer will be trimmed according to the to-be-determined wavelength feedback result from the sample wafers). Similarly, if a same set of process parameters is fixed for the second process, the first wafer thus served as a send-ahead wafer with its characterization data applicable to the remaining wafers in the plurality of wafers.

At step 610, method 600 further includes measuring a spectral response of the first layer characterized by a wavelength for each of the first plurality of optical circuit dies to obtain a wavelength distribution across the first wafer. This wavelength distribution corresponds to pre-trimming values of the first layer patterned without thickness trimming.

At step 612, method 600 additionally includes determining correlations between wavelength changes and thickness differences across the first wafer based on the wavelength distribution obtained at step 610 and the thickness distribution obtained at step 606. The correlations between the wavelength changes of the first layer on the first wafer and the thickness differences of the first layer on the first wafer should be one-to-one in terms of their locations on the wafer, as the measurements for both distributions are done on each of corresponding optical circuit dies. The correlations can also be compared with a historical correlation model between the wavelength change and the thickness change on previously established data collected for processes that resulted to desired product with certain target wavelengths.

At step 614, method 600 also includes determining a target thickness distribution for the first layer based on the correlations and a target wavelength. Following the previous step 612, by comparing the correlations for the current process on the first wafer with the historical correlation model, a target thickness distribution or a to-be-trimmed wafer map can be determined based on the target wavelength using the measured wavelength distribution (for the first layer on the first wafer) as feedback parameters. In a specific implementation, the target thickness distribution can be translated into a lookup table for thickness trimming fed into the trimming tool, based on which each product wafer is trimmed to achieve the corresponding target thickness at different locations across the wafer. The determined target thickness distribution, by design, would lead the characteristic wavelengths of all optical circuit dies toward the target wavelength across each of wafers in the same lot. For example, the optical circuit die is a CWDM demultiplexer, the characteristic wavelength is the center wavelength of the demultiplexer's channel output, and the target wavelength is a designated channel wavelength, e.g., 1300 nm. In another example, the optical circuit die is a DWDM demultiplexer, the characteristic wavelength is the center wavelength of the demultiplexer's channel output, and the target wavelength is a designated DWDM channel wavelength.

At step 616, method 600 further includes modifying the first layer on each of the plurality of wafers to obtain a second layer having the target thickness distribution. Specifically, the first layer on each of the remaining wafers of the plurality of wafers (the same lot) is modified or trimmed according to the to-be-trimmed wafer map determined in step 614. An Ion-beam trimming tool in-situ can complete this process in the same chamber of performing the thin-film deposition. Ion beam trimming is a technique used to fine-tune the properties of dielectric materials and devices, such as resistors or waveguides, after their initial fabrication. By directing a focused ion beam onto the device, e.g., the first layer, small amounts of material can be removed to adjust the device performance to the desired specifications. The target thickness distribution represents the characteristic of the modified layer designed to compensate for the wavelength variations and result in a new wavelength distribution with reduced variations around the target wavelength across each wafer. In other words, a feedback effect based on wavelength measurement can lead to improved optical characteristics uniformity.

At step 618, method 600 furthermore includes patterning the second layer to a second plurality of optical circuit dies on each of the plurality of wafers in the second process. Again, patterning the second layer is performed in the same second process, i.e., a series of downstream integration processes including photo lithography, etching, cleaning, etc., for the first wafer.

At step 620, method 600 finally includes singulating each of the plurality of wafers to obtain the second plurality of optical circuit dies. Each of these optical dies thus features a characteristic wavelength well targeting at the target wavelength. For example, each die is a CWDM demultiplexer corresponding to a center wavelength well targeting (within +/−2.5 nm) at a designated CWDM channel wavelength, e.g., 1300 nm. In another example, each die can be a DWDM demultiplexer with a center wavelength targeting within 1 nm at a designated DWDM channel wavelength.

In another embodiment, the method 600 proposed above can be used to improve lot-to-lot optical characteristics uniformity. For example, after applying method 600 the corresponding center wavelength can be corrected to desired target wavelength within +/−2.5 nm. While, across many wafer-lots, the corresponding center wavelength may drift away from the target wavelength. The lot-to-lot correlation between the wavelength drift and thickness correction can be deduced and used to generate a new lookup table to perform additional thickness trimming to the wafers in incoming lot. This will lead to improved lot-to-lot optical characteristics uniformity.

Figure 7A:
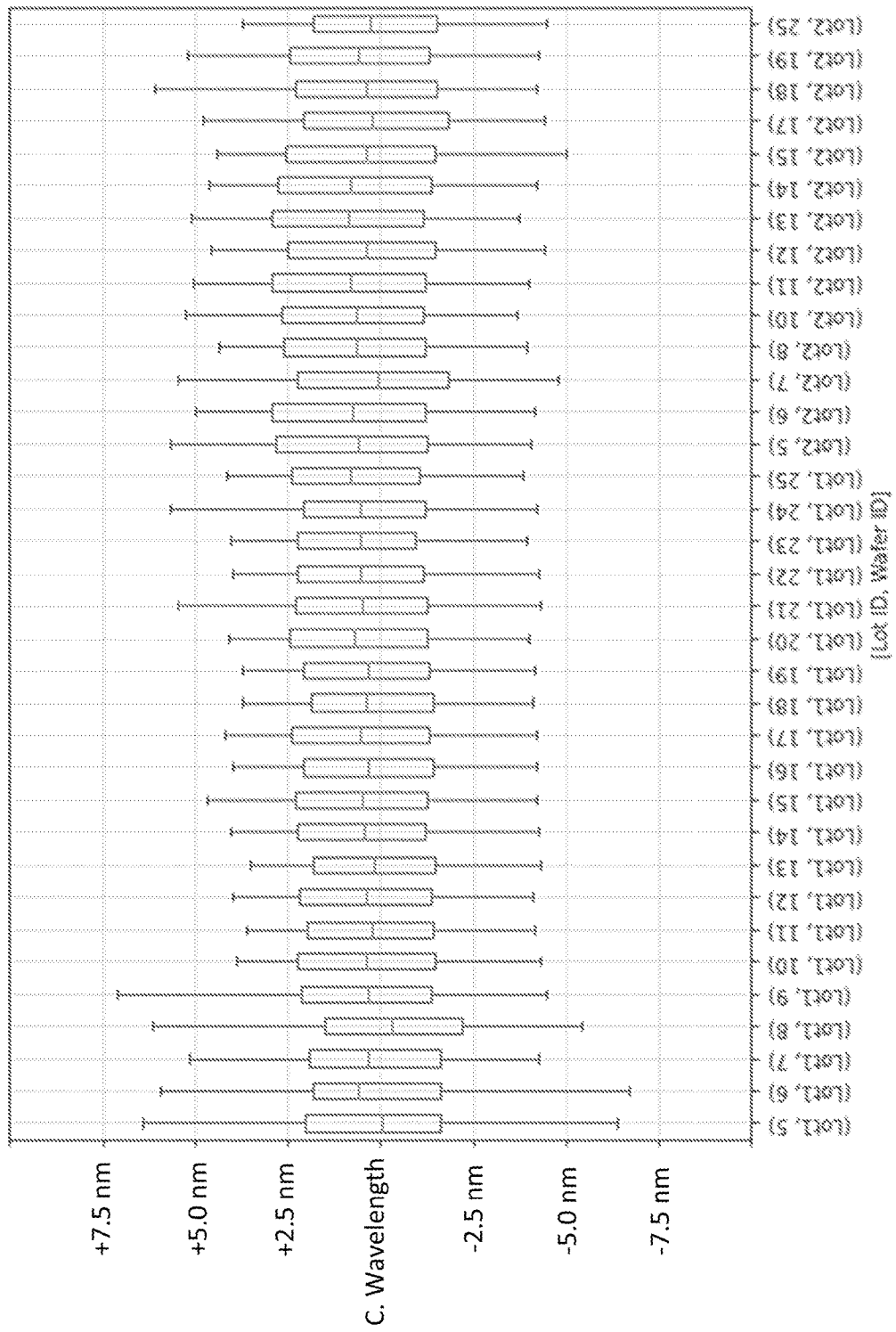
FIG. 7A is an exemplary diagram of output center wavelengths of in-wafer thin-film-based demultiplexers for all wafers before the film thickness is modified according to embodiments of the subject technology.

FIG. 7A is an exemplary diagram of measured center wavelength variations of in-wafer thin-film-based demultiplexers for all wafers before the layer thickness is modified according to embodiments of the subject technology. As shown in this example, the center wavelength of the demultiplexers based on the layer without thickness trimming on each wafer from two wafer lots are plotted. Around the target center wavelength (denoted as C. Wavelength), the errors can be as high as +/−5 nm.

Figure 7B:
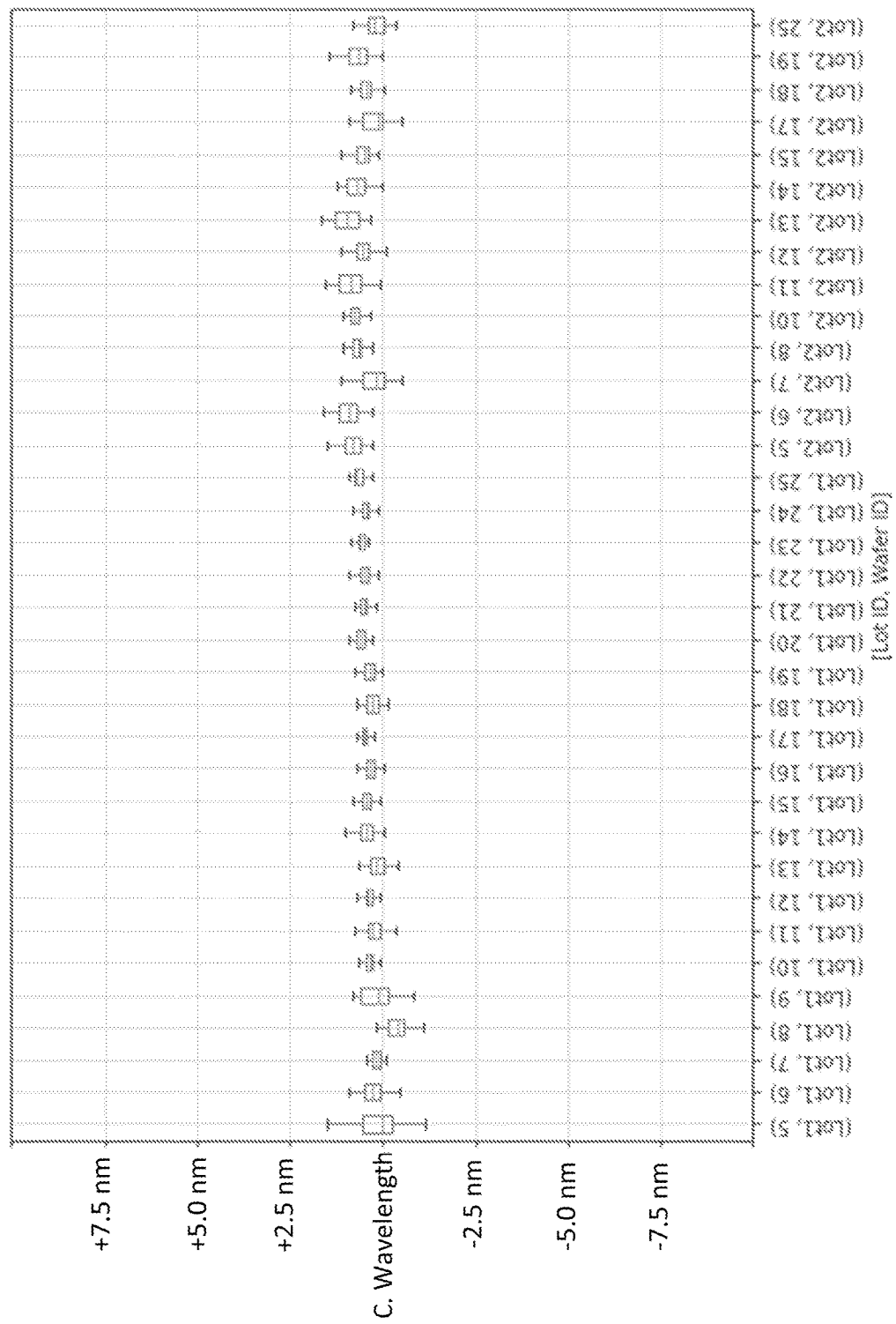
FIG. 7B is an exemplary diagram of output center wavelengths of in-wafer thin-film-based demultiplexers for all wafers after the layer of dielectric is modified according to embodiments of the subject technology.

FIG. 7B is an exemplary diagram of measured center wavelengths of in-wafer thin-film-based demultiplexers after the layer is modified according to embodiments of the subject technology. As shown in this example, the demultiplexers are made by the layer with trimmed thickness on wafers from the two wafer lots through a same process, yet the center wavelength errors have been reduced from +/−5 nm to just +/−1 nm. This demonstrates clear advantages of the non-uniform phase trimming based on the wavelength feedback yielding a much tighter distribution for all wafers in the same production cycle.

The proposed non-uniform trimming technique for improving optical characteristic uniformity is fully compatible with CMOS processes with an in-line trimming tool and measurement equipment. For wafer level process, the proposed method can be implemented with high throughput and no significant increase of fabrication circle time. The method can be generally used for compensating all other predictable phase errors from different sources including nonstoichiometric dielectric layer (e.g., SiNx film), cladding layers, or stress introduced in the downstream integration processes. This technique additionally can do more complex phase engineering as required from many applications, for example, targeting different target wavelengths at different region of wafer. In some embodiments, both feedforward mechanism (based on blanket wafer index) in method 500 and feedback mechanism (based on optical measurement correction) in method 600 can be utilized together to apply the non-uniform trimming process on the layers on product wafers. It is important to note that for all the approaches disclosed in the application the feedback and feedforward wafers are deposited at the same time as the product wafers to minimize the deposition tool and chamber's natural variances.

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. A method for processing semiconductor devices, the method comprising:
   providing a first wafer;
   providing a second wafer, the second wafer comprising a silicon material, wherein a size difference between the first wafer and the second wafer is less than 0.1%;
   forming a first layer of dielectric on the first wafer and a second layer of the dielectric on the second wafer;
   measuring a refractive index distribution of the second layer on the second wafer;

measuring a first thickness distribution of the first layer on the first wafer;

calculating a second thickness distribution for the first layer based on the refractive index distribution and the first thickness distribution; and removing material from the first layer based on thickness differences from the first thickness distribution to the second thickness distribution, resulting in a third layer in the second thickness distribution characterized by a spectral response with a characteristic wavelength variation less than 5 nm across the first wafer.

2. The method of claim 1, wherein the first wafer comprises a silicon-on-insulator wafer.

3. The method of claim 1, wherein the first layer of dielectric and the second layer of the dielectric comprise one of non-stoichiometric dielectrics selected from SiNx, SiONx, SiOx, and amorphous Si, the first layer and the second layer being formed by performing a deposition process.

4. The method of claim 3, the deposition process is selected from one or more methods comprising Chemical Vapor Deposition (CVD), Plasma-Enhanced Chemical Vapor Deposition (PECVD), Low-Pressure Chemical Vapor Deposition (LPCVD), and Atomic Layer Deposition (ALD).

5. The method of claim 1, further comprising reducing a thickness variation of the second layer before measuring the refractive index distribution.

6. The method of claim 1, wherein measuring the refractive index distribution comprises using an in-line ellipsometry.

7. The method of claim 1, wherein measuring the first thickness distribution comprises using ellipsometry, reflectometry, or spectrometry.

8. The method of claim 1, wherein removing material comprises using a focused beam of positive ions to scan across the first layer on the first wafer with a vertical resolution lower than 1 nm and a lateral resolution lower than 1 um.

9. The method of claim 1, further comprising dicing the first wafer to a first die, the first die comprising an optical circuit.

10. The method of claim 9, wherein the optical circuit comprises a thin-film optical filter.

11. The method of claim 1, wherein calculating the second thickness distribution comprises calculating a first regional thickness distribution on a first region of the first wafer corresponding to a first target wavelength and a second regional thickness distribution on a second region of the first wafer corresponding to a second target wavelength.

12. The method of claim 11, further comprising:

removing material from the first layer on the first region based on the first regional thickness distribution and material from the first layer on the second region based on the second regional thickness distribution, resulting in a fourth layer on the first region and a fifth layer on the second region, the fourth layer being characterized by a first spectral response with a characteristic wavelength within +/−2.5 nm around the first target wavelength and the fifth layer being characterized by a second spectral response with a characteristic wavelength within +/−2.5 nm around the second target wavelength.

13. The method of claim 12, further comprising:

singulating the first wafer to a first plurality of dies from the first region and a second plurality of dies from the second region, each of the first plurality of dies comprising an optical circuit based on the first modified layer having the characteristic wavelength within +/−2.5 nm around the first target wavelength and each of the second plurality of dies comprising an optical circuit based on the second modified layer having the characteristic wavelength within +/−2.5 nm around the second target wavelength.

14. A circuit comprising:

a first layer of a dielectric material on a portion of a first wafer, the first layer being characterized by a spectral response uniformity across the first wafer having a characteristic wavelength within +/−2.5 nm of a target wavelength;

wherein the first layer is made by:

depositing the dielectric material on the first wafer in a first process;

measuring a first thickness distribution across the first wafer;

determining a second thickness distribution across the first wafer based on a refractive index distribution and the first thickness distribution, the second thickness distribution corresponding to the target wavelength;

removing selectively the dielectric material based on the second thickness distribution to form the first layer; and patterning the first layer to define a plurality of dies, each die comprising an optical circuit based on the first layer.

15. The circuit of claim 14, wherein the first layer comprises one of non-stoichiometric dielectrics selected from SiNx, SiONx, SiOx, and amorphous Si and the first wafer comprises a SOI wafer.

16. The circuit of claim 14, wherein the refractive index distribution is determined by depositing the dielectric material on a second wafer in a second process arranged with a same setting as the first process, reducing thickness variation of the second layer on the second wafer; and measuring the reflection index distribution of the second layer.

17. The circuit of claim 14, wherein the optical circuit comprises an optical multiplexer or demultiplexer for coarse wavelength-division multiplexing (CWDM) optical link or for dense wavelength-division multiplexing (DWDM) optical link.

18. A method for processing semiconductor devices, the method comprising:

providing a plurality of wafers;

forming a first layer of dielectric on each of the plurality of wafers in a first process;

measuring a thickness distribution of the first layer across a first wafer selected from the plurality of wafers;

patterning the first layer to a first plurality of optical circuit dies on the first wafer in a second process;

measuring a spectral response of the first layer characterized by a wavelength for each of the first plurality of optical circuit dies to obtain a wavelength distribution across the first wafer;

determining correlations between wavelength changes and thickness differences across the first wafer based on the wavelength distribution and the thickness distribution;

determining a target thickness distribution for the first layer based on the correlations and a target wavelength;

modifying the first layer on each of the plurality of wafers to obtain a second layer having the target thickness distribution;

patterning the second layer to a second plurality of optical circuit dies on each of the plurality of wafers in the second process; and singulating each of the plurality of wafers to obtain the second plurality of optical circuit dies, each optical circuit being based on the second layer characterized by a spectral response with a center wavelength being within +/−2.5 nm of the target wavelength.

19. The method of claim 18, wherein each of the plurality of wafers comprises a silicon-on-insulator (SOI) wafer.

20. The method of claim 18, wherein the first layer of dielectric comprises one of non-stoichiometric dielectrics comprising SiNx, SiONx, SiOx, amorphous Si.

* * * * *